(12) United States Patent
Harigae (10) Patent No.: US 7,688,463 B2
(45) Date of Patent: Mar. 30, 2010

(54) IMAGE FORMING APPARATUS AND PRINT CONTROL METHOD THEREOF

(75) Inventor: Makoto Harigae, Tokyo (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 1205 days.

(21) Appl. No.: 11/223,332

(22) Filed: Sep. 9, 2005

(65) Prior Publication Data

US 2007/0058191 A1    Mar. 15, 2007

(51) Int. Cl.
G06F 15/00    (2006.01)
G03G 15/00    (2006.01)

(52) U.S. Cl. ........................................ 358/1.15; 399/45

(58) Field of Classification Search .............. 358/1.15, 358/1.16, 1.13, 1.9, 518, 501, 3.03, 3.06, 358/1.17, 1.18; 399/12, 27, 45, 66, 85, 82, 399/222, 299; 271/167, 10.02, 10.09; 705/1, 705/7, 8; 382/294, 162; 715/846
See application file for complete search history.

(56) References Cited

U.S. PATENT DOCUMENTS 6,433,884 B1 * 8/2002 Kawakami ................. 358/1.15

2006/0227354 A1 * 10/2006 Farrell et al. ............... 358/1.13

FOREIGN PATENT DOCUMENTS

| JP | 2000-267376 | 9/2000 |
|---|---|---|
| JP | 2001-274999 | 10/2001 |

* cited by examiner

*Primary Examiner*—Saeid Ebrahimi Dehkordy
(74) *Attorney, Agent, or Firm*—Patterson & Sheridan, LLP (57) ABSTRACT

An image forming apparatus according to the present invention is capable of executing printing processes for color images and monochromatic images and comprises a printer section capable of executing processes for color printing and monochromatic printing and a printing task management section for receiving a plurality of printing jobs including color printing jobs and monochromatic printing jobs as input, computationally determining the processing time required for each of the printing processes on the basis of the information indicating color printing or monochromatic printing and the information indicating the number of copies to be printed and outputting the data of the printing jobs of short processing time separately for monochromatic printing and color printing with priority to the printer section.

15 Claims, 5 Drawing Sheets

| Reception order | JOB | printing |
|---|---|---|
| 1 | J1 | color printing (printing process has started) |
| 2 | J2 | monochromatic printing (secure printing) |
| 3 | J3 | color printing (small scale) |
| 4 | J4 | monochromatic printing (small scale) |
| 5 | J5 | color printing (medium scale) |
| 6 | J6 | monochromatic printing (large scale) |
| 7 | J7 | monochromatic printing (small scale) |
| 8 | J8 | monochromatic printing (small scale) |

FIG. 4B

| Output order | JOB | printing |
|---|---|---|
| 1 | J1 | color printing (printing process has started) |
| 2 | J2 | monochromatic printing (secure printing) |
| 3 | J4 | monochromatic printing (small scale) |
| 4 | J7 | monochromatic printing (small scale) |
| 5 | J8 | monochromatic printing (small scale) |
| 6 | J3 | color printing (small scale) |
| 7 | J5 | color printing (medium scale) |
| 8 | J6 | monochromatic printing (large scale) |

IMAGE FORMING APPARATUS AND PRINT CONTROL METHOD THEREOF

BACKGROUND OF THE INVENTION

1. Field of the Invention

This invention relates to an image forming apparatus such as an MFP (multi-function peripheral), which is a digital composite machine, or a printer and also to an image forming apparatus and a print control method thereof that improve the printing efficiency of color printing and monochromatic printing.

2. Description of the Related Art

Known image forming apparatus such as MFPs are adapted to process image data that are prepared by a computer or the like for printing images. When monochromatic printing jobs and color printing jobs are input in an arbitrarily determined order, MFPs operate to print images of the printing jobs in the order in which the jobs are received. As a rule of thumb, the number of resources necessary for color printing using four colors of C (cyan), M (magenta), Y (yellow) and K (black) is four times as many as the number of resource necessary for monochromatic printing. Additionally, a long printing time is required for color printing because the printing engine has to be driven four times as long as the time necessary for monochromatic printing.

For the purpose of the present invention, a resource refers to the size of a memory or the capability of a CPU necessary for a printing process. Thus, color printing that processes four colors of C, M, Y and K requires resources four times as many as the resource necessary for monochromatic printing.

When printing a small number of copies by color printing or monochromatic printing after a color printing job or a monochromatic printing job of printing a large number of copies (e.g., more than 100 copies), the printing job of printing a small number of copies has to wait a long time for the completion of the printing job of printing a large number of copies. Such a long waiting time inevitably lower the efficiency of printing jobs.

Jpn. Pat. Appln. Laid-Open Publication Nos. 2001-274999 and 2000-267376 describe an image forming apparatus that rearranges the images to be printed so as to print color images or monochromatic images first and monochromatic images or color images, whichever appropriate, second in order to realize high speed printing when color printing jobs and monochromatic printing jobs coexist.

However, with the techniques described in the above cited patent documents, color images and monochromatic images are rearranged regardless of the number of copies to be printed so that if the first printing job involves a large number of copies and the second printing job is to produce a small number of copies, the second printing job has to wait for the completion of the first printing job.

DETAILED DESCRIPTION OF THE INVENTION

Throughout the description, the embodiments and examples shown should be considered as exemplars, rather than limitations on the apparatus of the present invention.

Now, the present invention will be described below in greater detail by referring to the accompanying drawings that illustrate a preferred embodiment of the invention.

Figure 1:
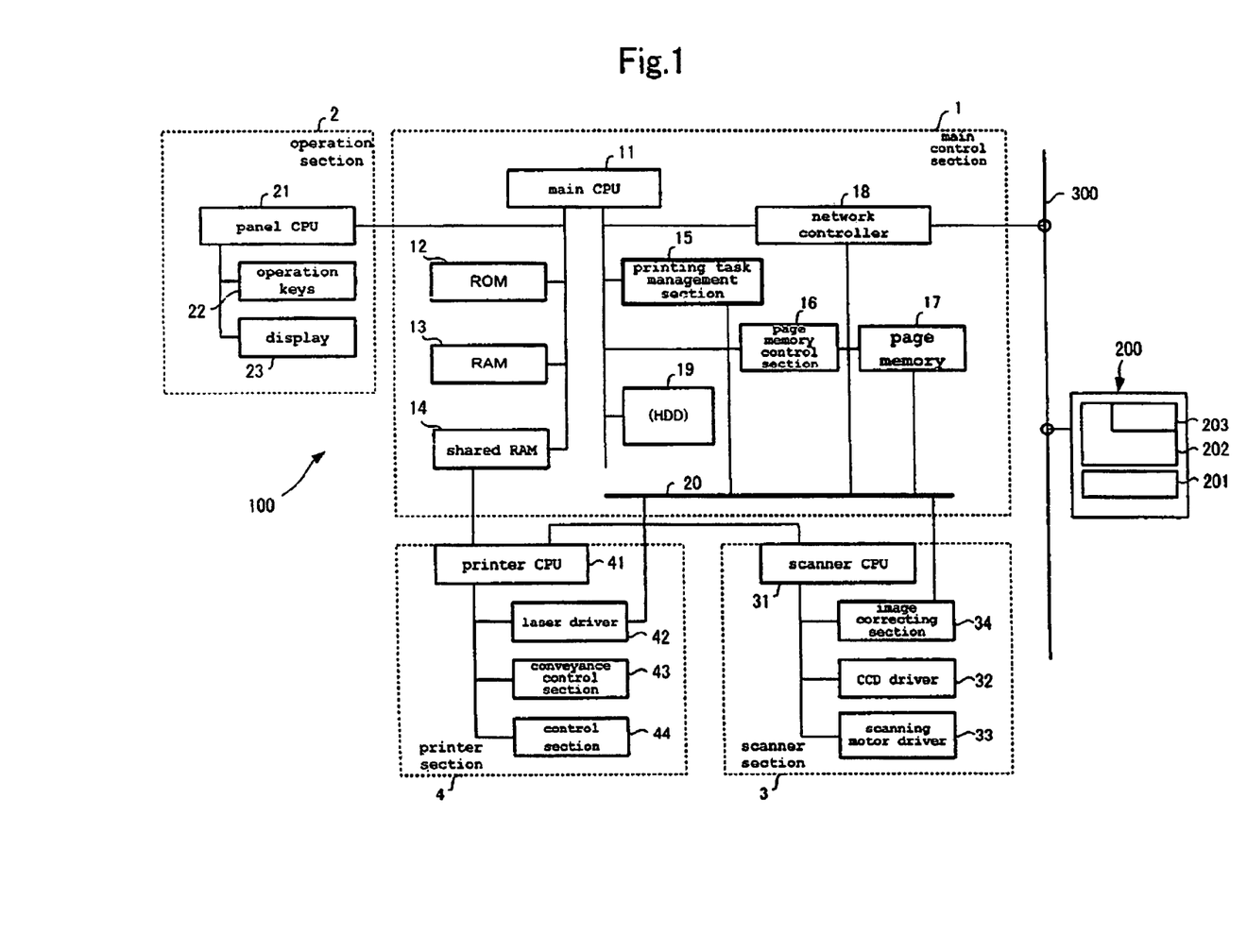
FIG. 1 is a schematic block diagram of an embodiment of image forming apparatus according to the invention, showing the configuration thereof.

FIG. 1 is a schematic block diagram of an embodiment of image forming apparatus according to the invention, showing the configuration thereof.

Referring to FIG. 1, the image forming apparatus 100 may typically be an MFP (multi-function peripheral), which is a digital composite machine. The image forming apparatus 100 can be connected to an external apparatus 200 such as a PC (personal computer) or some other appliance by way of network 300, which may typically be a LAN (local area network). Note that, in the following description, it is assumed that the image forming apparatus 100 is an MFP and the external apparatus 200 is a client PC.

The client PC 200 provides printing data and comprises a data generating section 201 for generating printing data such as those of texts and graphics by means of a piece of application software and a printer driver 202 for outputting the image data from the data generating section to the image forming apparatus 100 by way of the network 300 as PDL (page description language) data. The printer driver 202 is provided with an input section 203 by means of which the user can input commands such as a command for requesting a printing operation to the MFP 100.

On the other hand, the MFP 100 comprises a main control section 1, an operation section 2, a scanner section 3 and a printer section 4.

The control system of the MFP 100 is formed by a plurality of CPUs including a main CPU 11 arranged in the main control section 1, a panel CPU 21 arranged in the operation section 2, a scanner CPU 31 arranged in the scanner section 3 and a printer CPU 41 arranged in the printer section 4.

The main control section 1 comprises a main CPU 11, a ROM (read only memory) 12, a RAM 13, a shared RAM 14, a printing task management section 15, a page memory control section 16, a page memory 17, a network interface 18 and a storage device, which is an HDD 19. Reference symbol 20 denotes an image data bus.

The main CPU 11 controls the operation of the entire MFP 100 and the ROM 12 stores control programs and other programs. The RAM 13 temporarily stores control programs and data. The shared RAM 14 is adapted to be used for bi-directional communications between the main CPU 11 and the printer CPU 41.

The page memory control section 16 is adapted to write image data to and read image data from the page memory 17 on a page by page basis. The page memory 17 has a memory region that can store image data for a plurality of pages and is adapted to store compressed data of the image information transmitted from the scanner section 3 on a page by page basis.

The MFP 100 is adapted to transmit image data to and receive image data from the PC 200 by way of the network interface 18 that is connected to the network 300.

The HDD 19 is adapted to compress the image data read by the scanner section 3 and the image data from the PC 200 (including text data and graphic image data) and temporarily store them. The image data stored in the HDD 19 are processed by the printing task management section 15 and used by the printer section 4 to print images on sheets of paper.

The operation section 2 comprises a panel CPU 21 connected to the main CPU 11, various operation keys 22 and a display 23 that is typically formed by using liquid crystal The operation keys 23 are adapted to be used to input various commands including commands for specifying the number of printed copies, the sizes of printed copies, color printing or monochromatic printing and so on.

The scanner section 3 comprises a scanner CPU 31 for controlling the operation of the scanner, a ROM (not shown) that stores a scanner control program and other programs and a RAM (not shown) for storing data as well as a CCD driver 32 for driving a color image sensor, a scanning motor driver 33 for controlling the rotary motion of the scanning motor and an image correcting section 34. The scanner section 3 irradiates the original placed on the original table of the scanner section 3 with light from an exposure lamp and receives light reflected by the original by means of a CCD in order to read the image of the original and convert it into image data.

The image correcting section 34 comprises an A/D converter circuit for converting the analog R, G, B signals output from the color image sensor into digital signals, a shading correction circuit for correcting the fluctuations of output signals due to the dispersive operation of the color image sensor and a line memory for temporarily storing the corrected digital signals from the shading correction circuit.

The printer section 4 comprises a printer CPU 41 for controlling the operation of the printer section, a ROM (not shown) that stores a printer control program and other programs and a RAM (not shown) for storing data as well as a laser driver 42 for driving a laser, a conveyance control section 43 for controlling the operation of conveying sheets of paper and a control section 44 for controlling the operations of electrification, development and transfer.

The printing task management scanning 15, the page memory 17, the network interface 18, the image correcting section 34 and the laser driver 42 are connected to each other by way of an image data bus 20.

The printing task management section 15 manages the printing operation in such a way that printing jobs with a short processing time are processed with priority among the printing jobs input to the MFP 100. For the purpose of the present invention printing jobs refer to jobs for printing one or more images from the printing data transmitted from the client PC 200 and do not include jobs (copy jobs) for copying images.

The printing task management section 15 processes a color printing job in a color printing process but processes a monochromatic printing job in a monochromatic printing process and intensively processes one or more additional monochromatic printing jobs that can be carried out with the first monochromatic printing job at a time depending on the available resources.

Additionally, the printing task management section 15 computationally determines the printing time of each printing job, which may be a color printing job or a monochromatic printing job, on the basis of the number of copies to be printed and controls the overall printing operation in such a way that, if a small scale printing job (for not more than 10 copies for example) comes after a large scale printing job (for not fewer than 100 copies for example), it gives priority to the small scale printing job.

Still additionally, when the printing task management section 15 receives a printing job that requires a high degree of security (to be referred to as secure printing or private printing hereinafter), it gives priority to the secure printing job (or the private printing job). When the printing task management section 15 receives a priority printing job, it immediately starts the priority printing job if the printer section 4 is currently available but it waits and starts the priority printing job immediately after the end of the current printing job if the printer section 4 is currently in operation.

Beside the above-described priority printing jobs, when the printing task management section 15 receives a time-specified printing job with a clock time specified for the completion thereof or a copy job, it gives priority of the same level to such a job. Color printing and monochromatic printing are not discriminated for such priority printing jobs. For the purpose of the present invention, a copy job refers to a printing job to be carried out by using the copy feature of the image forming apparatus.

In this way, the printing task management section 15 does not change the order of carrying out priority printing jobs having high priority such as security printing jobs and time-specified printing jobs but may change the order of carrying out ordinary printing jobs depending on the number of copies (printing processing time).

Figure 2:
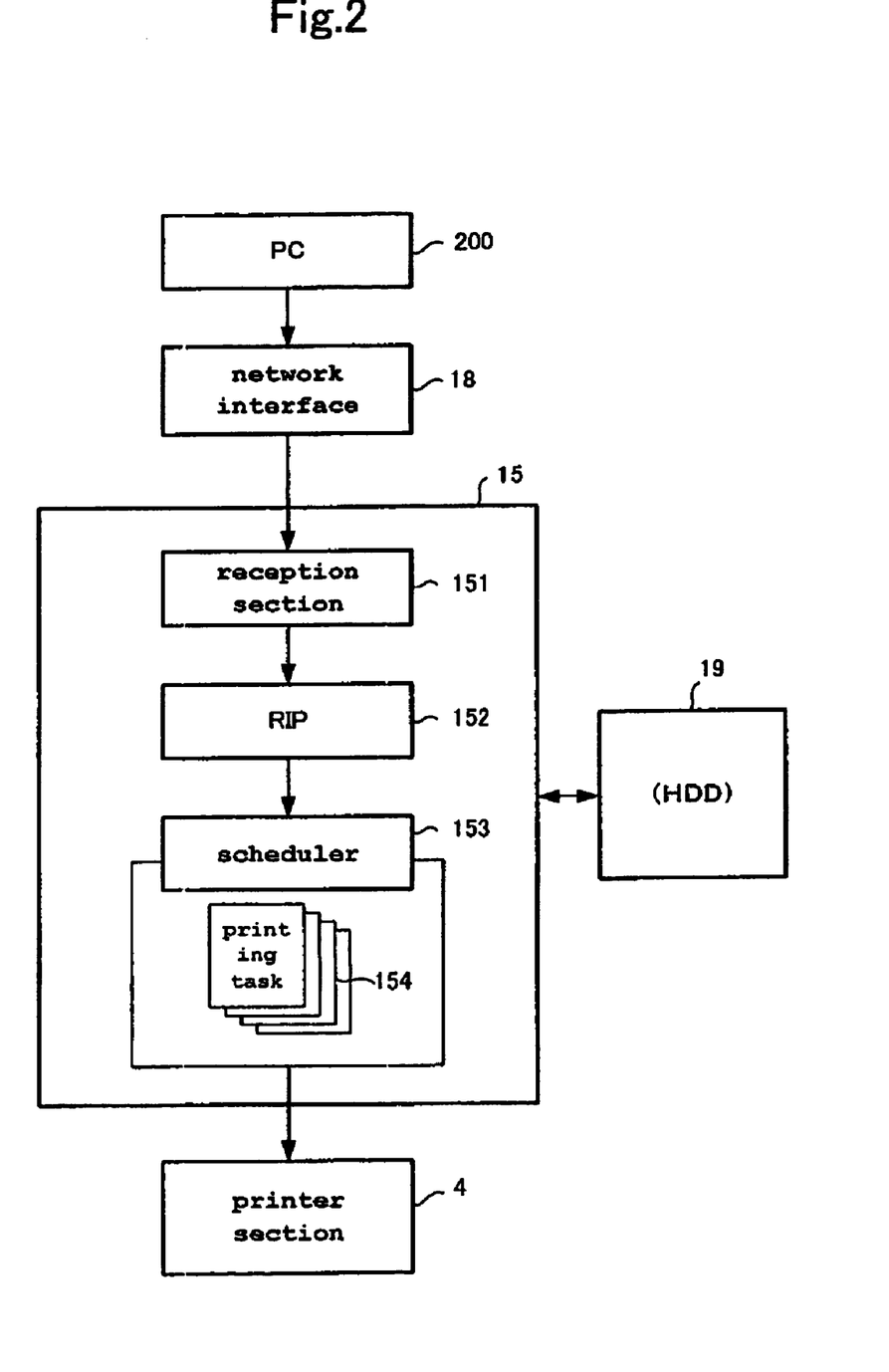
FIG. 2 is a schematic block diagram of the printing task management section of the image forming apparatus of the embodiment of FIG. 1, showing the configuration thereof.

FIG. 2 is a schematic block diagram of the printing task management section 15 of the image forming apparatus of the embodiment of FIG. 1, showing the configuration thereof.

The printing task management section 15 has a reception section 151, an RIP (raster image processor) 152 and a scheduler 153 and is connected to the HDD 19.

The reception section 151 receives and processes the printing jobs input from the client PC 200 and other sources of printing jobs by way of the network interface 18 and sends them to the RIP 152 in the received order. The processes that the printing task management section 15 executes can be roughly divided into RIP processes (raster image processor processes) and scheduling processes of rearranging the RIP-processed images and outputting them to the printer section 4. The scheduler 153 executes scheduling processes.

The printing data input from the client PC 200 and other sources of printing jobs normally take the PDL (page description language) format and hence they have to be transformed into data of the bit map format. The RIP 152 transforms data of the PDL format into data of the bit map format (also referred to as data of the raster format or image data). The data transformed by the RIP 152 are temporarily stored in the HDD 19.

The data of the raster format that are stored in the HDD 19 are scheduled by the scheduler 153. Then, they are read out from the HDD 19 when their printing turn actually comes and output to the printer section 4 (printing engine). For the purpose of the present invention, the operation of scheduling and executing a printing process is referred to as "printing task".

The scheduler 153 that manages printing tasks 154 estimates the processing time necessary for printing the images of each printing task 154 on the basis of the information telling if it is related to color printing or monochromatic printing and the information on the number of copies to be produced and schedules the printing tasks 154 in such a way that printing jobs having a relatively short processing time are processed first separately for monochromatic printing and for color printing. In this way, the order of printing is determined for the printing tasks 154. When estimating the processing time, a printing task of printing a single color image is assumed to take four times as long as the time necessary from a printing task of printing a single monochromatic image. Thus, when determining the order of executing printing tasks, the processing time necessary for printing the images of each printing task is estimated first.

On the other hand, secure printing jobs and copy jobs are carried out with priority. Therefore, the scheduler 153 firstly checks if there is a priority printing job or not and, if there is, it schedules the printing jobs in such a way that the priority printing job is carried out first and the printing jobs other than priority printing jobs are rearranged on the basis of the processing time of each of them. Then, data of the raster format are read out from the HDD 19 and delivered to the printing engine so that the printing operations are assigned and executed in a predetermined order.

Figure 3:
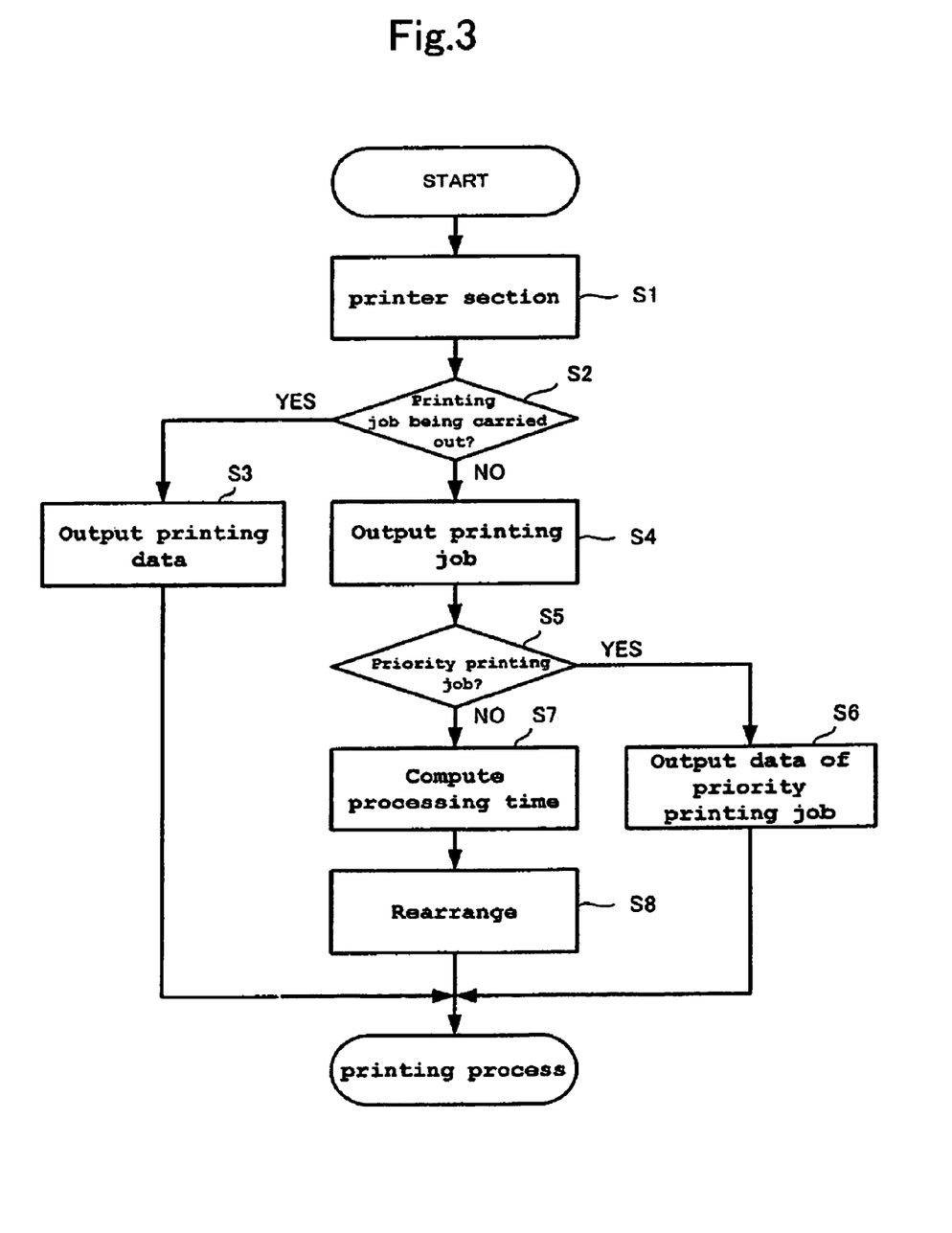
FIG. 3 is a flowchart of the operation of the printing task management section of FIG. 2.

FIG. 3 is a flowchart of the operation of scheduling printing tasks of the printing task management section 15 of FIG. 2.

Referring to FIG. 3, in Step S1, the printing task management section 15 receives printing jobs. In Step S2, the printing task management section 15 determines if there is a printing job that is already being subjected to a printing process or not. If there is, the printing task management section 15 outputs the printing data of the printing job to the printer section 4 (Step S3).

If, on the other hand, it is determined that there is no printing job that is already being subjected to a printing process, the printing task management section 15 extracts the printing job that has not been subjected to a printing process yet out of the jobs it received in Step S4. Then, it determines if the extracted job is a priority printing job or not in Step S5. If it is a priority printing job, the printing task management section 15 sequentially outputs the printing data of the priority printing job in the order it received to the printer section 4 (Step S6).

If, on the other hand, the printing task management section 15 determines that the extracted printing job is not a priority printing job but an ordinary printing job, it then computationally determines the processing time of the printing job in the next step, or Step S7, and rearranges the printing jobs it has received, giving priority to printing jobs with a relatively short processing time, separately for monochromatic printing and for color printing in Step S8 before it outputs the printing data to the printer section 4.

Figure 4A:
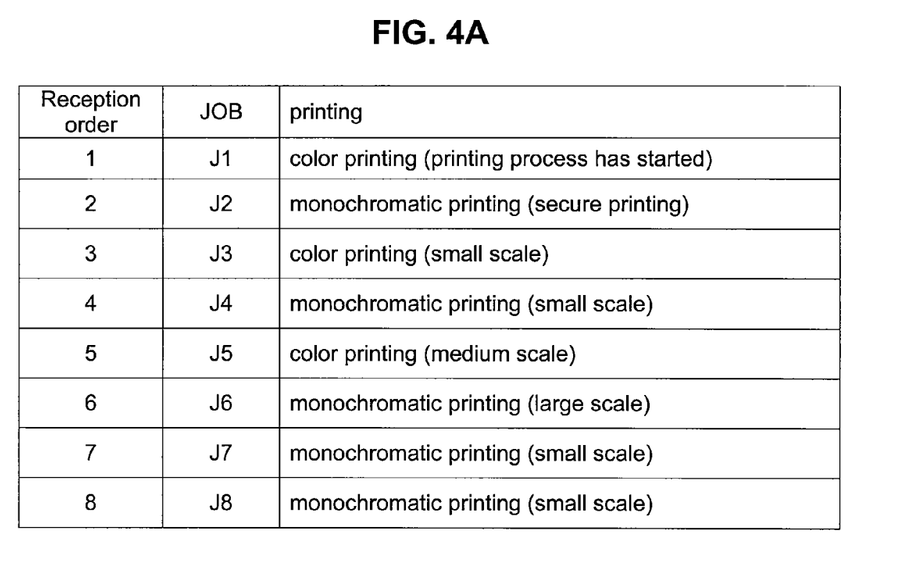
FIGS. 4A and 4B are schematic illustrations of the operation of the printing task management section of FIG. 2.
Figure 4B:
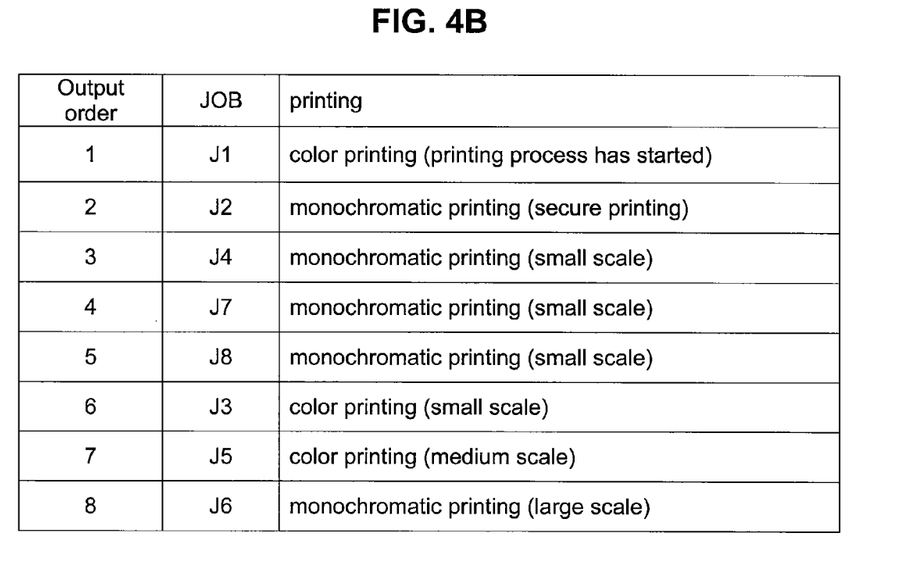

FIG. 4A is a schematic illustration of printing jobs that may be received by the printing task management section 15 and FIG. 4B is a schematic illustration of the printing jobs that are scheduled by the scheduler 153 in terms of printing order.

Assume, for example, that a plurality of printing jobs J1 through J8 are received in the order illustrated in FIG. 4A. Assume also that a printing job for printing 10 or less copies is a small scale printing job and a printing job for printing more than 10 but not more than 100 copies is a medium scale printing job, while a printing job for printing more than 100 copies is a large scale printing job.

Now, assume that the printing process of printing job J1 has already started. Then, after scheduling process, the print data are output in the order shown in FIG. 4B and the printing jobs are performed.

Referring to FIG. 4A, the printing process of printing job J1 has already started. Then, therefore, it is kept going on. Since printing job J2 is a secure printing job, which is a priority printing job, the order of printing the printing job J1 and the printing job J2 is not changed. On the other hand, the order of printing the other printing jobs (the printing job J3 and the subsequent printing jobs) is changed.

In the printing job J3 and the subsequent printing jobs in FIG. 4A, the small scale printing jobs for monochromatic printing with a short processing time are printing jobs J4, J7 and J8. Therefore, the printing jobs J4, J7 and J8 are grouped and their printing orders are so changed as to be carried out third fourth and fifth respectively. As for the remaining printing jobs, the printing job with the next shortest processing time is the small scale printing job J3 for color printing and then comes the medium scale printing job J5. Thus, the printing order is changed in such a way that the printing jobs J3 and J5 are carried out as the sixth and seventh printing jobs. The printing job with the longest processing time is the large scale printing job J6 for monochromatic printing so that the printing order is also changed in such a way that the printing job J6 is carried out as the eighth printing job. As a result of changing the printing order, the printing jobs are scheduled to show an order of J1, J2, J4, J7, J8, J3, J5 and J6.

In this way, monochromatic printing jobs for a number of copies less than a predetermined value are collectively carried out first and then color printing jobs for a number of copies less than a predetermined value are also collectively carried out so that printing jobs for a large number of copies are carried out last to remarkably improve the efficiency of printing by computationally determining the processing time required for each of the printing jobs on the basis of the information on the number of copies to be printed and if the printing job is monochromatic or color. Therefore, printing jobs for a small number of copies that can be processed in a short period of time are not required to wait long.

The schedule of FIG. 4B is an example and the present invention is by no means limited thereto. For example, the printing order may be changed in such a way that, if there is a plurality of color printing jobs that require only a short period of time for printing, they may be collectively carried out first and, if there is a plurality of monochromatic printing jobs that require only a short period of time for printing, they may be collectively carried out second so that printing jobs that require a long period of time for printing may be carried out last. While priority jobs include secure printing jobs and copy jobs in the above description, they may additionally include jobs for which the user gives priority so that such user priority printing jobs may also be carried out with priority.

Figure 5A:
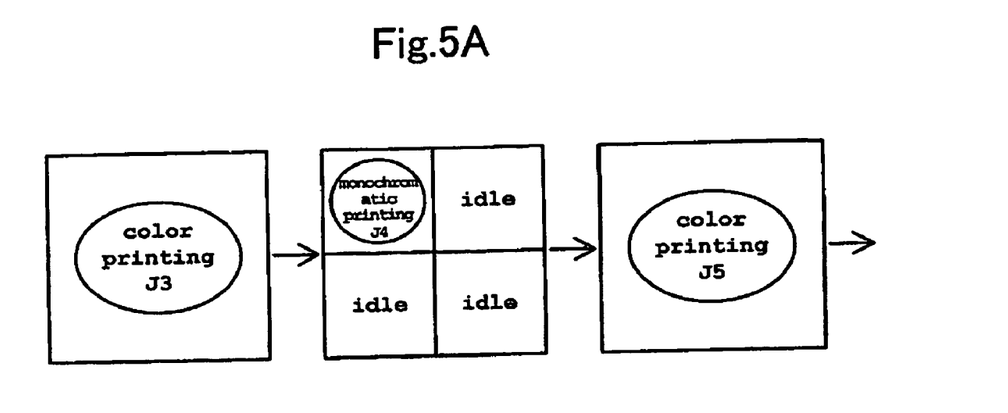
FIGS. 5A and 5B are schematic illustrations of the resource allocation of the image forming apparatus of the embodiment of FIG. 1.
Figure 5B:
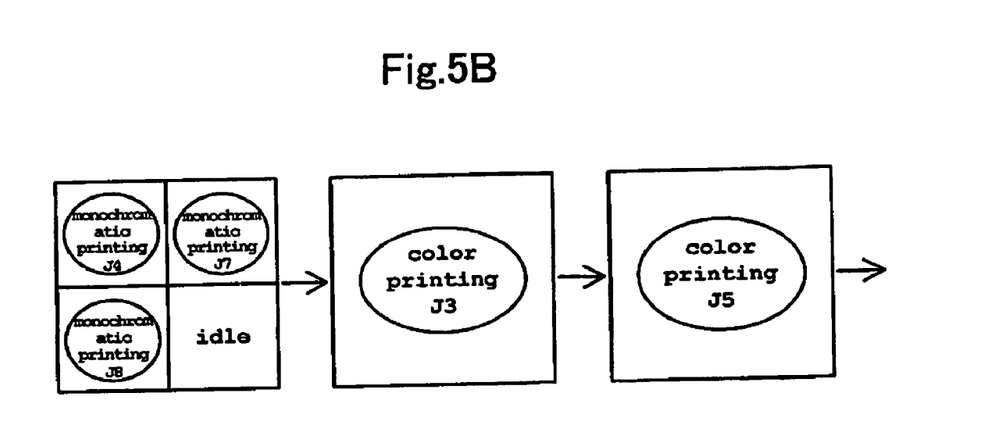

FIGS. 5A and 5B are illustrations of the resource allocation at the time of printing processing of the image forming apparatus according to the present invention.

If it is assumed that an operation of printing a color copy takes time that is four times as long as the time necessary for an operation of printing a monochromatic copy and color printing jobs and monochromatic printing jobs are not carried out collectively as shown in FIG. 4A (in the order of J3, J4, J5), the resources are effectively exploited for color printing but they remain idle for monochromatic printing because monochromatic printing consumes resources only at a rate of ¼ of color printing as shown in FIG. 5A.

On the other hand, if a plurality of monochromatic printing jobs including J4, J7 and J8 are grouped and carried out collectively and then color printing jobs including J3 and J5 are carried out as shown in FIG. 4B, the number of resources that remain idle is remarkably reduced as shown in FIG. 5B. In other words, it is possible to exploit the resources effectively.

In conventional printing processes, many resources are left idle for monochromatic printing at the cost of efficiency as shown in FIG. 5A. However, according to the present invention, if there is a plurality of monochromatic printing jobs, resources can be effectively exploited by allocating resources concurrently as shown in FIG. 5B.

As described above in detail, an image forming apparatus according to the present invention can carry out color printing jobs and monochromatic printing jobs having a small number of copies to be printed with priority so that it is possible to improve the printing efficiency and reduce the printing time to a greater advantage on the part of the user.

Although exemplary embodiments of the present invention have been shown and described, it will be apparent to those having ordinary skill in the art that a number of changes, modifications or alternations to the invention as described herein may be made, none of which depart from the spirit of the present invention. All such changes, modifications, and alterations should therefore be seen as within the scope of the present invention.

What is claimed is:

1. An image forming apparatus capable of executing printing processes for color images and monochromatic images, the apparatus comprising:
    a printer section capable of executing processes for color printing and monochromatic printing; and
    a printing task management section for receiving a plurality of printing jobs including color printing jobs and monochromatic printing jobs, computationally determining the processing time required for each of the printing jobs and outputting to the printer section with priority and separately for monochromatic printing and color printing, the data of the printing jobs of short processing time,
    wherein the printing task management section computationally determines the processing time of each of the received printing jobs on the basis of the first information indicating color printing or monochromatic printing and the second information indication the number of copies to be printed.

2. The apparatus according to claim 1, wherein the printing task management section groups monochromatic printing jobs according to the processing time of each of them according to the first information and the second information and outputs the data of the grouped printing jobs to the printer section.

3. The apparatus according to claim 1, wherein the printing task management section outputs to the printer section the data of monochromatic printing jobs of short processing time before the data of color printing jobs of short processing time.

4. The apparatus according to claim 3, wherein the printing task management section outputs to the printer section the data of monochromatic printing jobs that do not have short processing time after the data of color printing jobs of short processing time.

5. An image forming apparatus capable of executing printing processes for color images and monochromatic images, the apparatus comprising:
    a printer section capable of executing processes for color printing and monochromatic printing; and
    a printing task management section for receiving a plurality of printing jobs including color printing jobs and monochromatic printing jobs, computationally determining the processing time required for each of the printing jobs and outputting to the printer section with priority and separately for monochromatic printing and color printing, the data of the printing jobs of short processing time.
    wherein when there is a printing job to be processed with priority among the plurality of received printing jobs, the printing task management section outputs the data of the priority printing job to the printer section with priority.

6. The apparatus according to claim 5, wherein the printing task management section outputs to the printer section the data of monochromatic printing jobs of short processing time before the data of color printing jobs of short processing time.

7. The apparatus according to claim 6, wherein the printing task management section outputs to the printer section the data of monochromatic printing jobs that do not have short processing time after the data of color printing jobs of short processing time.

8. An image forming apparatus capable of executing printing processes for color images and monochromatic images, the apparatus comprising:
    a printer section capable of executing processes for color printing and monochromatic printing; and
    a printing task management section for receiving a plurality of printing jobs including color printing jobs and monochromatic printing jobs, computationally determining the processing time required for each of the printing jobs and outputting to the printer section with priority and separately for monochromatic printing and color printing, the data of the printing jobs of short processing time,
    wherein when a preceding printing process is being executed by the printer section at the time of receiving one or more printing jobs, the printing task management section executes the received printing jobs after the end of the preceding printing process.

9. The apparatus according to claim 8, wherein the printing task management section outputs to the printer section the data of monochromatic printing jobs of short processing time before the data of color printing jobs of short processing time.

10. The apparatus according to claim 9, wherein the printing task management section outputs to the printer section the data of monochromatic printing jobs that do not have short processing time after the data of color printing jobs of short processing time.

11. An image forming apparatus capable of executing printing processes for color images and monochromatic images, the apparatus comprising:
    a printer section capable of executing processes for color printing and monochromatic printing; and
    a printing task management section for receiving a plurality of printing jobs including color printing jobs and monochromatic printing jobs, computationally determining the processing time required for each of the printing jobs and outputting to the printer section with priority and separately for monochromatic printing and color printing, the data of the printing jobs of short processing time,
    wherein the printing task management section has:
    a reception section for receiving the plurality of printing jobs;
    an RIP (raster image processor) for transforming the printing jobs received by the reception section into data of a printing format; and
    a scheduler for rearranging the raster image data processed by the RIP and outputting to the printer section the rater image data of monochromatic printing jobs having a short processing time and those of color printing jobs having a short processing time separately and with priority.

12. The apparatus according to claim 11, wherein the printing task management section outputs to the printer section the data of monochromatic printing jobs of short processing time before the data of color printing jobs of short processing time.

13. The apparatus according to claim 12, wherein the printing task management section outputs to the printer section the data of monochromatic printing jobs that do not have short processing time after the data of color printing jobs of short processing time.

14. An image forming apparatus capable of executing printing processes for color images and monochromatic images, the apparatus comprising:

a printer section capable of executing processes for color printing and monochromatic printing;

a reception section for receiving a plurality of printing jobs including color printing jobs, monochromatic printing jobs and priority printing jobs; and a scheduler for outputting the data of one or more priority printing jobs with priority, if such priority printing jobs are input, out of the received printing jobs, computationally determining the processing time required for each of the remaining printing jobs and outputting the data of the printing jobs of short processing time, separately for monochromatic printing and color printing, sequentially to the printer section, wherein the scheduler computationally determines the processing time of each printing job other than the one or more priority printing jobs on the basis of the first information indicating color printing or monochromatic printing and the second information indicating the number of copies to be printed, groups at least monochromatic printing jobs according to the processing time of each of them and outputs to the printer section the data of the grouped monochromatic printing jobs and the data of the color printing jobs in the ascending order of the processing time periods.

15. A printing control method of an image forming apparatus having a printer section capable of executing printing processes for color images and monochromatic images, the method comprising:

a reception step of sequentially receiving a plurality of printing jobs including color printing jobs and monochromatic printing jobs;

a computation step of computationally determining the processing time of each of the received printing jobs on the basis of the first information indicating color printing or monochromatic printing and the second information indicating the number of copies to be printed; and an output step of outputting to the printer section with priority and separately for monochromatic printing and color printing, the data of the printing jobs of short processing time, wherein if one or more priority printing jobs are received in the reception step, the data of the priority printing jobs are output to the printer section with priority.

* * * * *